June 10, 1969
K. JAGER
3,449,655
SATURABLE CORE TRANSFORMER CIRCUIT
Filed Oct. 16, 1967
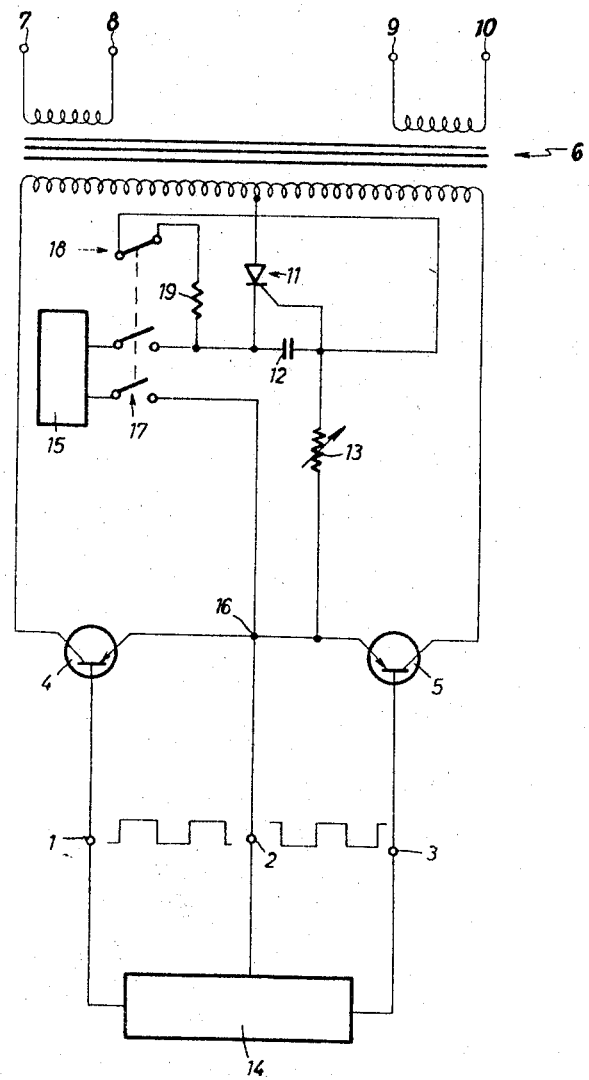
KARL JAGER
INVENTOR
BY *A. Donald Stozzy*
ATTORNEY

United States Patent Office 3,449,655
Patented June 10, 1969

3,449,655
SATURABLE CORE TRANSFORMER CIRCUIT
Karl Jager, Nuremberg, Germany, assignor to International Standard Electric Corporation, New York, N.Y., a corporation of Delaware
Filed Oct. 16, 1967, Ser. No. 675,710
Claims priority, application Germany, Oct. 21, 1966, St 26,019
Int. Cl. H02m 1/18
U.S. Cl. 321—11                                              7 Claims

ABSTRACT OF THE DISCLOSURE

The invention comprises a circuit in which a pair of transistors are connected in push-pull across the primary winding of a saturable core transformer. The transistors are gated on alternately. A silicon controlled rectifier (SCR) is connected in a series circuit from a primary winding center tap through a collector voltage supply to a junction of the transistor emitters. An RC circuit is connected to the SCR gate to delay the SCR conduction for a predetermined period to prevent high magnetizing currents from damaging the circuit.

Background of the invention

This invention relates to electrical apparatus, and more particularly a saturable core transformer having a high magnetizing current protective circuit.

In the past, saturable core transformer circuits have been operated with controllable rectifiers. In order to switch such controllable rectifiers into the conductive condition it is known to apply suitable pulses to the control electrode of said rectifiers. For example, rectangular pulses may be used which are generated in a way known per se by a control generator. For saturable core transformer circuits controllable semi-conductor rectifiers are used in push-pull circuit whereby said rectifiers are alternately switched into the conductive condition so that the desired alternating current is obtained at the output of the circuit arrangement. It is required that two groups of pulses be generated which are staggered to each other so that one controllable rectifier is always switched into the conductive condition while the other one is non-conductive. In such circuit arrangements frequently magnetic voltage stabilizers are used in the power circuit which stabilizers operate with a highly saturated transformer.

If now in a circuit arrangement with controllable rectifiers a highly saturated transformer is arranged in the power circuit, difficulties occur when switching said circuit arrangement is switched or because the transformer of the voltage stabilizer takes up such a high magnetizing current. In this case the controllable rectifiers are excessively loaded for a short time and the commutation in the circuit is disturbed.

Summary of the invention

It is the object of the present invention to avoid these disadvantages.

This is achieved, according to the invention, in that means are provided to delay conduction.

This can be achieved, according to a further embodiment of the invention in that a silicon controlled rectifier (SCR) is provided in a circuit with two transistors connected in push-pull across the primary winding of a saturable core transformer. The SCR is switched into the conductive condition with a certain delay, when the circuit arrangement is started. A part of the pulse provided to fire the SCR is cut off and only a remaining part of said pulse is effective.

The delayed switching of the additional SCR into the conductive condition can be achieved in a simple way in that the voltage at the firing electrode of said rectifier is made dependent upon the voltage at a capacitor which is charged via a resistor. It is suitable to use a variable resistor so that charging of the capacitor and, consequently, the delay in rendering the additional SCR conductive can be set arbitrarily.

It may occur that the circuit arrangement of the present invention is started again shortly after it had been switched off. In such a case the intended effect may not or may not completely be obtained, because the capacitor which determines the voltage at the control electrode of the additional SCR may be still charged at least partially. This is particularly the case, if a large amount of energy is stored, e.g. if in the input circuit of the circuit arrangement electrolytic capacitors are used for smoothing. Therefore further measures must be taken so that a complete discharge of the capacitor is obtained when the circuit arrangement is switched off. This is achieved, according to a further embodiment of the invention in that means are provided with the aid of which the capacitor is discharged when the circuit arrangement is switched off. It is suitable to combine said means with the switch itself so that the capacitor is discharged each time the circuit arrangement is switched off.

If, as mentioned above, energy storage is provided in the input circuit of the arrangement particularly in the form of electrolytic capacitors for smoothing, it is useful to close a circuit shunting the capacitor through a resistor. This circuit may be connected by an auxiliary switch ganged with the main switch.

The circuit arrangement according to the present invention is now in detail explained with the aid of an example.

Brief description of the drawing

The drawing shows a circuit arrangement representing a part of a saturable core transformer circuit.

Description of the preferred embodiment

The pulses, serving to control two controllable rectifiers, operating in push-pull, are generated by a control generator 14 of which the drawing only shows the amplifier stage with the transistors 4 and 5. Rectangular half-waves are applied to the input terminals 1 and 2 and 2 and 3, respectively, which rectangular half-waves are shifted towards each other in such a way that the controllable rectifiers, controlled by said-waves, are alternately switched into the conductive condition. The rectangular half-waves, applied to the input terminals, are indicated in the figure. They are produced by a circuit arrangement known per se. The rectangular half-waves have a duration of ten milliseconds, for example. The two transistors 4 and 5 are actuated e.g., in the 50 c./s. rhythm.

The amplified control pulses are transmitted to the outputs 7 and 8 and 9 and 10, respectively, via the transformer 6. With the pulses at said outputs always one of the two push-pull actuated controllable rectifiers of the power stage is switched into the conductive condition, so that a suitable alternating current is obtained at the output of the circuit arrangement.

If now a highly saturated transformer is inserted into the power circuit of the controllable rectifiers, e.g. a magnetic voltage stabilizer, the above-mentioned difficulties occur when switching on the arrangement.

According to the invention the additional controllable rectifier 11 (SCR) is provided which permits the firing pulses applied to the input terminals 1 and 2 or 2 and 3, respectively, to reach the outputs 7 and 8 or 9 and 10, respectively, only then, if said additional rectifier is conductive. Said controllable rectifier 11 is switched into the conductive condition in that a suitable DC-voltage is applied to the control electrode, i.e. gate, of said rectifier. The voltage applied to the control electrode of the controllable rectifier 11 however is determined by the voltage, prevailing at the capacitor 12. When switching on the capacitor 12 is charged via the variable resistor 13 so that the first firing pulse can reach the output only then, when the capacitor 12 has been charged to the firing voltage of the controllable rectifier 11. The circuit elements now have values such that only a part of the first pulse reaches the corresponding output, e.g., only an impulse of five milliseconds duration, if the pulses are ten milliseconds long. The duration of the first pulse can be set with the aid of resistor 13.

The capacitor 12 remains charged during operation to its maximum voltage, so that other pulses have their normal length.

A source 15 of direct current is connected between a mutual transistor emitter junction 16 SCR 11 through a main switch 17. An auxiliary switch 18 ganged to main switch 17 discharges capacitor 11 through a resistor 19 when the main switch is opened.

What is claimed is:

1. A circuit comprising: a saturable core transformer having a primary winding; a transistor connected from each end of said primary winding in push-pull, said transistors having a common emitter junction, each transistor having a base; source means to apply an alternating voltage to each base 180 degrees out of phase with each other; a gating device; a source of DC potential; a first switch, said first switch having a first pair of contacts; said transformer having a center tap; said device, said source, and said first pair of contacts being connected serially from said center tap to said common emitter junction; and control means responsive to the closure of said first contacts for rendering said device conductive at a predetermined time after said closure.

2. The invention as defined in claim 1, wherein each transistor has a collector connected to a different corresponding end of said primary winding, said source means also being connected to said common emitter junction, said gating device being a silicon controlled rectifier poled to be made conductive by said source, said transistors also being of a type to be made conductive by said source, said rectifier having a gate, an anode, and a cathode, said control means including a capacitor connected from said gate to said cathode and a charging resistor connected from said capacitor to said source in a manner to cause said capacitor to charge when said first contacts are closed.

3. The invention as defined in claim 2, wherein said charging resistor is connected from said gate to said common emitter junction.

4. The invention as defined in claim 3, wherein said control means includes means to discharge said capacitor when said first contacts are opened.

5. The invention as defined in claim 4, wherein said discharge means includes a second switch ganged with said first switch having a second pair of contacts to close when said first contacts are opened and a discharge resistor connected serially with said second contacts across said capacitor.

6. The invention as defined in claim 2, wherein said control means includes discharge means to discharge said capacitor when said first contacts are opened.

7. The invention as defined in claim 6, wherein said discharge means includes a second switch ganged with said first switch having a second pair of contacts to close when said first contacts are opened and a discharge resistor connected serially with said second contacts across said capacitor.

References Cited

UNITED STATES PATENTS

| | | | |
|---|---|---|---|
| 3,161,834 | 12/1964 | Noyes | 321—11 XR |
| 3,237,126 | 2/1966 | Baycura et al. | 321—45 XR |
| 3,328,598 | 6/1967 | Katz. | |
| 3,366,867 | 1/1968 | Dodge | 321—45 |
| 3,377,540 | 4/1968 | Meyer | 321—11 |

JOHN F. COUCH, *Primary Examiner.*

W. M. SHOOP, JR., *Assistant Examiner*

U.S. Cl. X.R.

321—45; 331—62, 113